(No Model.)

C. W. CRUTSINGER.
FRUIT CLIPPER AND GATHERER.

No. 516,389. Patented Mar. 13, 1894.

Witnesses:

Inventor:
C. W. Crutsinger.
By Keller & Stark
Attorneys.

UNITED STATES PATENT OFFICE.

CHARLES W. CRUTSINGER, OF ST. LOUIS, MISSOURI.

FRUIT CLIPPER AND GATHERER.

SPECIFICATION forming part of Letters Patent No. 516,389, dated March 13, 1894.

Application filed October 9, 1893. Serial No. 487,649. (No model.)

*To all whom it may concern:*

Be it known that I, CHARLES W. CRUTSINGER, of the city of St. Louis, State of Missouri, have invented certain new and useful Improvements in Fruit Clippers and Gatherers, of which the following is a full, clear, and exact description, reference being had to the accompanying drawings, forming a part hereof.

My invention has relation to a combined fruit clipper and gatherer and consists in the novel arrangement and combination of parts more fully set forth in the specification and pointed out in the claims.

Figure 1:
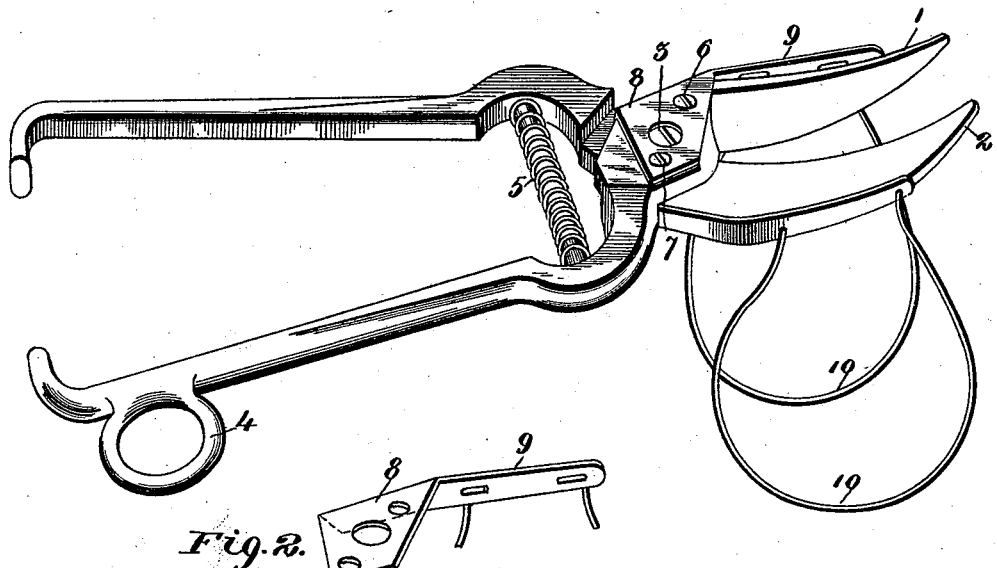
Figure 2:
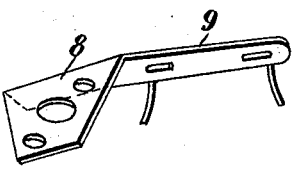
Figures 4, 5:
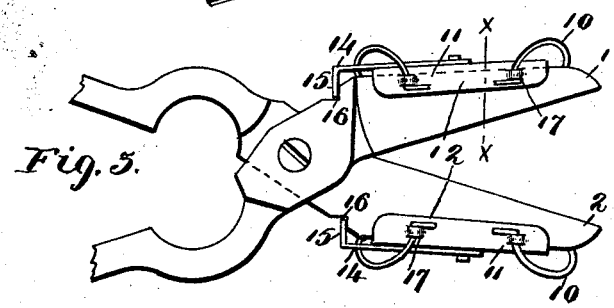
Figure 5:
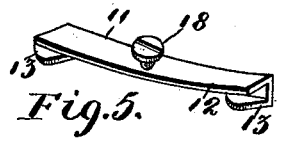

In the drawings, Figure 1 is a perspective view of my complete invention. Fig. 2 is a perspective of one of the detached plates to be secured to the jaw of the clipper. Fig. 3 is a plan view of a modification of my invention. Fig. 4 is a cross section taken on the line $x$—$x$ of Fig. 3; and Fig. 5 is a still further modification of the plate carrying the gathering loop.

The object of my invention is to construct a fruit clipper and gatherer which will cut the fruit and simultaneously grasp the same, and allow it to be released after the same has been cut, without necessitating the use of both hands—one for clipping and the other for grasping—as is now, so far as I am aware generally done. The device is best applicable for cutting and gathering oranges and lemons although the application thereof is not necessarily limited to that class of fruit.

Referring to the drawings, 1 and 2 represent the jaws of an ordinary clipper, the jaws being pivoted at 3. A finger loop 4 is attached to the operating handle of one or both of the jaws as is well known. On the opposite side of the pivotal point 3 is a spring 5 which keeps the jaws 1 and 2 in an expanded or open position when the device is not being used. Secured by means of screws 6 and 7 or in any equivalent mechanical manner to each jaw is a plate 8, 8, each having an extended elastic projecting strip 9, 9, running in close proximity to the outer edge of the jaws 1 and 2. To each of these strips 9, 9, is secured an elastic, preferably of wire, loop 10, 10, the ends of said loop passing through the strip and bent along the inner surface of the same as best shown in Fig. 2, although they might be soldered thereto or otherwise secured.

In Fig. 3 I have shown a modification of the manner of making the attachments. In said figure the plate 11 is slipped over the jaws 1 and 2 being retained thereon by the flange 12 and fingers 13, 13, and prevented from slipping off by the retaining spring 14 bent at right angles at 15 to come in contact with the shoulder 16 of the jaw. This arrangement however is precautionary, since the jaws 1 and 2 being beveled as seen in cross section in Fig. 4, retain the plates 11 very well under ordinary circumstances. In this figure the ends of the loops 10 are passed through suitable eyes 17 formed in the plates 11.

In Fig. 5 I have shown a still further modification of the retaining plate 11 wherein the same is shown provided with the binding screw 18 for retaining it on the jaws 1 and 2.

In the operation of the device, as the stem of the fruit is clipped by the action of the jaws 1 and 2, the loops 10, 10 grasp the fruit before it has had time to drop to the ground, thus dispensing with the necessity of using the free hand of the operator for that purpose, especially in places where it is inconvenient to insert said hand. If the orange or lemon is of unusual size and there is danger of unduly straining the elasticity of the loops 10, 10, then the elastic strips 9, 9, of the plates 8 will give sufficiently to relieve the loops 10. When the jaws 1 and 2 are expanded by the operator the fruit can be gently dropped into a suitable basket or receptacle provided for that purpose. The loops 10 with their plates 8 are removable and replaceable and can be attached to clippers now already in the market; and each jaw being thus provided with an independent loop, the loops operate with the jaws and thus are bound to seize the fruit in the act of cutting or immediately subsequent to the cutting. There is therefore no danger of bruising the fruit and unnecessarily handling the same before being deposited in the basket or receptacle. The handling and bruising are thus reduced to a minimum. The tendency of the loops also is to keep the orange or lemon close to the jaws so that the device cuts near the fruit leaving only a short stem. There is therefore less danger of the stem bruising adjoining fruit in the process of packing.

Having described my invention, what I claim is—

1. A fruit clipper and gatherer having a pair of cutting jaws, and means forming a part of each jaw and operated thereby for grasping the fruit proper and forcing the same in proximity to said jaws in the act of cutting, substantially as and for the purpose set forth.

2. A fruit clipper and gatherer having a pair of cutting jaws, a loop secured to each jaw and operated thereby for grasping the fruit in the act of cutting, and allowing the same to be released when the jaws are opened, substantially as set forth.

3. A fruit clipper and gatherer having a pair of cutting jaws, a flexible loop secured to each jaw and operated thereby for grasping the fruit in the act of cutting, and allowing the same to be released when the jaws are opened, substantially as set forth.

4. A fruit clipper and gatherer having a pair of cutting jaws, a plate secured to each jaw and forming a part thereof, a flexible loop attached to said plate and operated by the jaws for grasping the fruit in the act of cutting, and allowing the same to be released when the jaws are opened, substantially as set forth.

5. A fruit clipper and gatherer having suitable cutting jaws, plates secured to each jaw, elastic strips forming part of said plates and located in close proximity to the edges of the jaws, flexible loops having their free ends secured to said elastic strips at a suitable distance apart, said loops and elastic strips being operated by the jaws as and for the purpose set forth.

In testimony whereof I affix my signature in the presence of two witnesses.

CHARLES W. CRUTSINGER.

Witnesses:
C. F. KELLER,
EMIL STAREK.